Patented Mar. 17, 1931

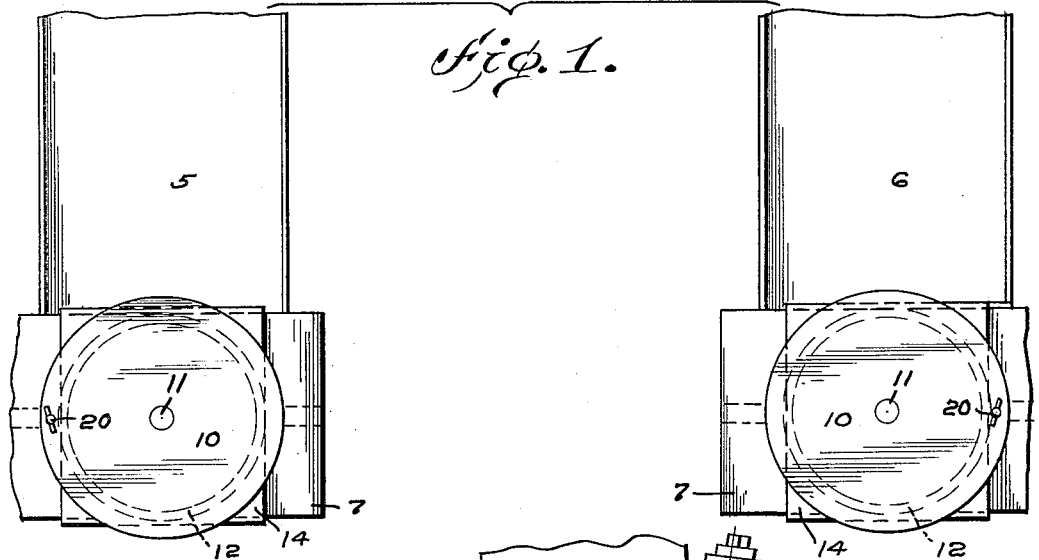
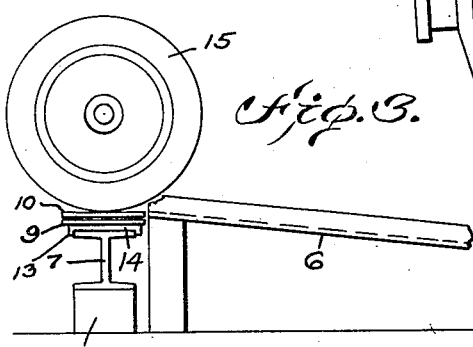
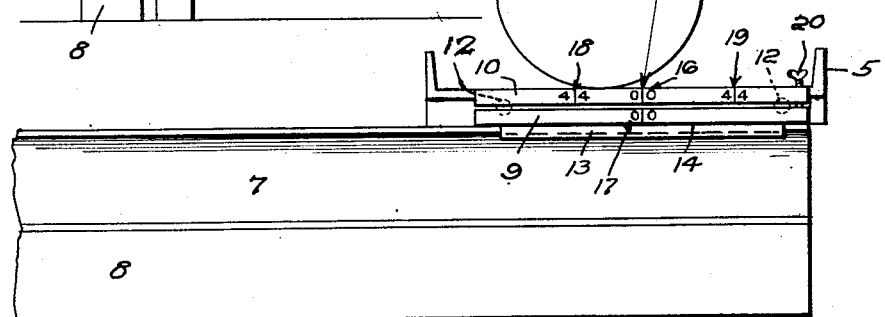

1,796,979

UNITED STATES PATENT OFFICE

GEORGE A. BELLS, OF PASADENA, CALIFORNIA

RADIUS GAUGE

Application filed April 24, 1928. Serial No. 272,439.

This invention relates to a radius gauge for the guiding wheels of automobiles, and it has, for its object, to provide an improved indicator, adapted to be actuated when the front wheels of the automobile are moved under the influence of the steering gear, to indicate the degree of movement of said wheels; said indicating mechanism being so arranged that when the front wheels of the automobile are set to move in accordance with the readings thereof, the front wheel on the outside of a turn will be set to describe an arc of greater radius than the wheel that is on the inside of the turn, so that excessive wear upon the tires will be avoided.

Further objects and advantages of the invention will be set forth in the detailed description which follows.

In the accompanying drawing,

Fig. 1 is a plan view, and

Fig. 2 is a fragmentary front elevation of a mechanism constructed in accordance with the present invention, and Fig. 3 is a side elevation upon a reduced scale.

In the drawing, the reference characters 5 and 6 designate two longitudinally extending inclined channel irons. These channel irons constitute track-ways for the wheels of an automobile, the front wheels being driven up the inclines when the device is to be used, and the forward ends of the channel irons terminating at the upper surfaces of transverse I-beams 7, and these I-beams are, in turn, supported upon base blocks 8. The radius gauges of the present invention are used in pairs. That is, there is a gauge for the right front wheel to rest upon and a gauge for the left front wheel to rest upon, at the time that the steering mechanisms of the wheels is being adjusted. In the particular embodiment of the invention chosen for purposes of illustration, each gauge comprises a fixed base disc 9, and a turnable disc 10, that is pivoted to the base disc at 11. I preferably dispose anti-friction members, such as ball bearings 12, between the two discs, and I preferably anchor the gauges in place in some suitable manner, such, for example, as by the provision of lips 13, which are adapted to engage over the uppermost flanges of the I-beams, said lips being formed upon a plate 14, that is fixed to the base disc 9.

It is apparent that if an automobile is driven up the inclined run-ways provided by the channel irons, until the front wheels 15 thereof rest upon the movable discs 10, said discs 10 will turn about their pivots 11 when the front or guiding wheels 15 are moved under the influence of the steering gear of the automobile. The discs 10 are provided with zero marks 16, which, when the front wheels are set for straight ahead movement, register with corresponding zero marks 17, upon the base discs 9. In addition, the movable discs 10 are provided with the graduations indicated at 18 and 19, which are intended to register with the graduation 17 in the adjustment and setting of the guiding wheels. It will be observed that the graduation 18, in Fig. 2, is much nearer the graduation 17 than the graduation 19. If desired, set screws 20, or equivalent binding means may be utilized to hold the movable discs against turning during the time that the front wheels are being placed in position thereon. After the front wheels are positioned upon the movable discs the set screws are loosened to permit the discs to turn as the wheels twist under the influence of the steering wheel.

It is further to be noted that it is the right hand gauge that is shown in Fig. 2. Thus, when the right hand front wheel is set in accordance with these readings it will turn further to the right than to the left for a given movement of the steering wheel so that when the automobile is turned to the right, the track of the right hand wheel will be upon an arc of shorter radius than when the automobile is turning to the left. The readings upon the left hand gauge are such that when the left hand wheel is set in accordance therewith, it will turn further to the left than to the right, and, consequently, will describe an arc of shorter radius than the right hand wheel, when the automobile is turning to the left. The aforesaid movements of the front wheels are under the influence of the conventional steering mechanism (not shown).

It is clear that if the front wheels of an automobile are each set to move the same distance in both directions, upon opposite sides of the straight or center line, excessive wear upon one or the other of the front tires must result, for if the degree of turn is right for one wheel it will manifestly be wrong for the other, because the two wheels do not describe arcs of the same radius.

By the use of the mechanism herein shown and described. I am able to adjust the throw of the two front guiding wheels under the influence of the hand steering wheel to cause them to assume the right position for the kind and degree of turn that is being made.

In most automobiles the left wheel is always set correctly because it is directly controlled by the steering gear, but the right wheel is controlled through the steering arm and tie-rod. The wheels may be set perfectly when the car is in a straight ahead position, but on the turn, the right wheel may be turning too far for the arc of the curve that it is to describe, or it may not be turning far enough. The degree of movement is easily determined by the position of the steering arms, but as far as I am aware, no mechanism has heretofore been provided for accurately indicating the degree of movement upon opposite sides of the center line, and the degree of movement of the two wheels with respect to each other.

While I have shown the movable discs as being supported upon the I-beams, it is clear that the nature of the particular structure embodied is not a matter of importance, since any form of structure may be used for these discs. I have illustrated the particular form of support, shown, because it corresponds to the support that I find of utility in connection with the axle straightening and camber adjusting mechanism, shown in my co-pending application, Serial No. 199,945, filed June 20th, 1927.

It is to be understood that the invention is not limited to the precise construction set forth, but that it includes within its purview whatever changes fairly come within either the terms or the spirit of the appended claims.

Having described my invention, what I claim is:

1. Mechanism of the character described, comprising two indicating members, each of which comprises a fixed base member and a rotative member mounted to turn with respect to the base member, said rotative members being of a nature to receive and support the front wheels of an automobile, there being cooperating indicating means upon the base and rotative members respectvely, comprising a zero indicating point and indicating point indicative of the degree of turn to the right and left of the zero point, one of the last named indicating points being farther from the zero point than the other.

2. Mechanism of the character described, comprising a pair of elements adapted to receive and support the front wheels of an automobile, each of said elements comprising a fixed base and a turnable disc, there being an indicating point upon the fixed base of each member, and a zero point upon each of said discs which register with the indicating point of the base when the wheels of the automobile and are in straight ahead position, and there being additional registration marks upon the discs at opposite sides of the zero point thereof, the marks indicating the degree of turn in one direction being farther from the zero point than the marks indicating the degree of turn in the opposite direction, to an extent to indicate the proper degree of turn for said wheels.

In testimony whereof he affixes his signature.

GEORGE A. BELLS.